Sept. 2, 1958     A. K. McMILLAN, JR     2,850,733
AIRCRAFT RADIO BEAM ANTENNA AND MOUNT Filed Nov. 4, 1955     2 Sheets-Sheet 1

INVENTOR.
ANDREW K. McMILLAN, JR.

BY

ATTORNEY.

Sept. 2, 1958 A. K. McMILLAN, JR 2,850,733
AIRCRAFT RADIO BEAM ANTENNA AND MOUNT
Filed Nov. 4, 1955 2 Sheets-Sheet 2

INVENTOR.
ANDREW K. McMILLAN, JR.
BY
ATTORNEY.

United States Patent Office 2,850,733
Patented Sept. 2, 1958

2,850,733

AIRCRAFT RADIO BEAM ANTENNA AND MOUNT

Andrew K. McMillan, Jr., Briarcliff, N. Y., assignor to General Precision Laboratory Incorporated, a corporation of New York Application November 4, 1955, Serial No. 545,003

6 Claims. (Cl. 343—765)

This invention relates to aircraft radio antennas and their mounts and more especially to stabilized supports for high frequency beam antennas.

When high frequency beam antennas, such as microwave antenna arrays, are mounted in a high speed aircraft it is desirable if not essential that the radome thereof be flush with the aircraft surface to eliminate air drag. Since a radome must be transparent to the microwave radiation, its surface cannot be crossed by metal structural members. Radomes therefore constitute weak spots in the aircraft skin, and the radome perimeter must be surrounded with strengthening members to provide aircraft structure of adequate strength and stiffness. Since the mass of these strengthening structures increases rapidly with increase in the area of the radome it is highly desirable to keep the radome area as small as possible.

Aircraft microwave radio has many radar-like uses in which a receiver-transmitter unit is combined with an antenna array to emit a narrow beam of radiated energy and to receive echo energy reflected from objects outside the aircraft. A particular class of such devices directs its beam or beams downwardly and receives echoes reflected from the earth's surface. In this class of devices the angle which the radio beam makes with the vertical is of importance, and when quantitative use is made of the apparatus this angle enters the calculations. It follows that the antenna array which both transmits and receives the radio energy must remain at a fixed attitude relative to the vertical direction at all times, even when the aircraft attitude changes as in pitching, rolling, turning, climbing and driving. It therefore is common practice in such cases to maintain the array approximately in a horizontal plane. This has been done in a variety of well-known ways and is commonly termed stabilizing the antenna array.

In stabilizing the array, bearings must be provided so that relative rotation of the array and the aircraft can occur about two orthogonal axes in a horizontal plane. These two axes are usually chosen parallel to the fore-and-aft aircraft line and perpendicular thereto and are sometimes termed the roll and pitch axes respectively.

It is necessary to position the antenna array within the aircraft at a location which is above the radome and separated from it by several inches, so that during rolling and pitching the stabilized antenna will not come into contact therewith. This, however, normally requires the radome to be made larger than it needs to be at zero roll and pitch angles, to insure that during rolling, pitching and rotation of the array assembly in azimuth the edge of the radio beam is not cut off by the edge of the radome.

In order to obviate such necessity of greatly enlarging the radome area the instant invention provides a mechanism whereby the array assembly may be translated in horizontal directions in concert with the motions of pitching and rolling. The array assembly may be translated transversely of the aircraft during rolling so as to maintain its center vertically above the radome opening center. It also is translated longitudinally of the airplane during pitching so as to maintain its center above the radome center.

The translatory movements may be accomplished in either of two ways; by combining the translations with the pitch and roll rotations, or by translating in separate motions but coordinated with the rotations. These separate translations can be applied to the array assembly alone, to the array assembly with other components inside the gimbal rings, or they can be applied outside the gimbal rings. In this invention the last method is employed, the entire unit including gimbal rings being translated in lateral and longitudinal motions separate from the roll and pitch rotations, but coordinated with them.

Specifically, the invention includes a unitary structure combining an antenna array and a receiver-transmitter. This unitary structure is supported in a gimbal system permitting rotation about a roll or fore-and-aft axis and about a lateral or pitch axis. The gimbal system is, for example, in turn supported by a carriage on which the gimbal system can slide in the fore-and-aft direction, and this carriage is supported by a frame on which it can slide in the lateral direction. The frame in turn is secured to the aircraft structure. Alternatively the two translations can be transposed.

In addition to these four motions a fifth motion of azimuth rotation may be required. This motion in some cases is such that the antenna array is positioned in the ground track direction, and therefore is displaced from the aircraft fore-and-aft direction by the amount of the aircraft drift angle. This fifth motion is inserted between the receiver-transmitter-array unit and the gimbal bearings, so that the gimbal bearing axes of rotation remain in the fore-and-aft and lateral directions, while the array axis may be displaced to an angle intermediate between these directions.

The general purpose of this invention is to move the stabilized array during pitch and roll so that minimum radome area is required.

More specifically, the purpose of this invention is to translate an aircraft radio beam stabilized antenna array above an aperture and substantially parallel thereto so as to cause the beam to pass through the aperture at all pitch, roll, and azimuth angles within the design limits.

Still more specifically, the purpose of this invention is to provide a gimbal-mounted antenna array with longitudinal and lateral translatory motions outside the gimbals, these motions being coordinated with pitch and roll rotations to permit use of minimum radome area.

A further understanding of this invention may be secured from the detailed description and drawings, in which.

Figure 3:
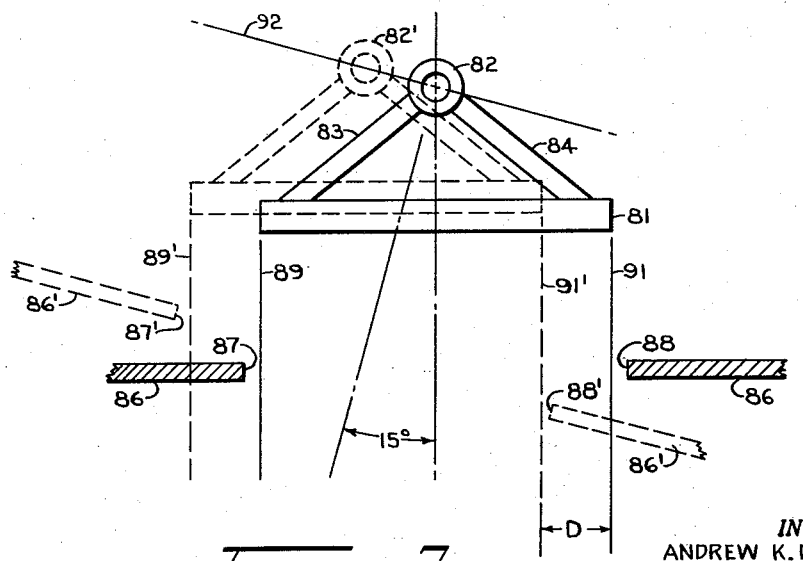

Figure 3 schematically represents an antenna array and associated radome and illustrates their positional relationships when rotation and translation occur.

Figure 4:
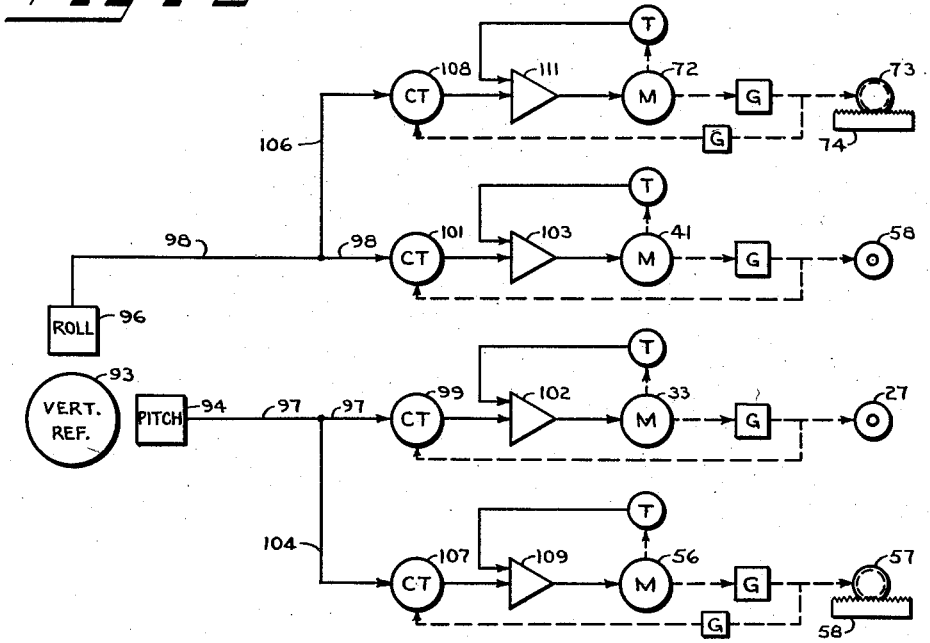

Figure 4 depicts the schematic circuit for control of pitch and roll rotation and translation from a vertical reference component.

Figure 1:
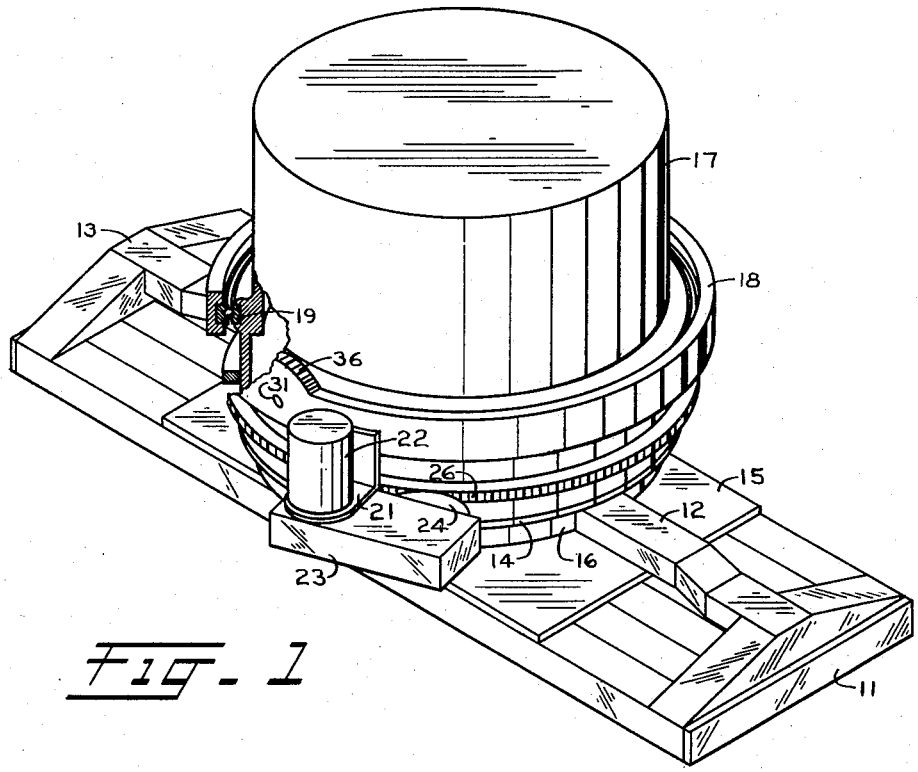
Figure 1 represents a microwave receiver-transmitter together with its antenna array and including an inner gimbal ring by which it is supported.

Referring now to Fig. 1, a microwave receiver-transmitter of the radar type employs a planar antenna array assembly 11. This array assembly may be of any type but in this example it consists of six linear arrays positioned side by side in an approximately horizontal plane with a row of microwave space radiators on the underside of each of the linear arrays. The microwave radiation may be considered to have the form of a rectangular cylindrical beam directed downward and having a cross section comprehending all of the radiators. Actually the beam will spread slightly so that its form is a pyramidal frustum instead of a cylinder, but for the purpose of this description such slight spreading may be disregarded close to the array except for its effect on the size of radome aperture.

The array assembly 11 is fed at its ends by two hollow rigid waveguides 12 and 13 through a microwave switch and duplexer from a microwave transmitter. The duplexer is also connected to a microwave receiver.

All of these components including the switch, duplexer, transmitter and receiver are mounted directly or indirectly on a round plate 14. A cylindrical extension 16 of plate 14 connects it to a rectangular plate 15, to which the array assembly is secured. Thus all of these operative components are secured to round plate 14, cylindrical extension 16 and rectangular plate 15 and with them form a rigid assembly. The feed waveguides 12 and 13 enter the cylindrical extension 16 and are terminated inside at the switch.

A cylindrical cover 17 is secured to the round plate 14 by four bolts (not shown), so that the joint may easily be made airtight, permitting pressurization of the microwave components in accordance with usual practice. Connections to equipment within cover 17 are made through plate 14 by wires and plug connectors carrying direct or low-frequency currents. These wires are conventionally sealed and are not further depicted or described. All mechanical connections to the parts so far mentioned are made to or through the cover 17, so that the array assembly 11 with plate 14 and all other microwave components can be easily removed by unfastening the plate 14 from the cover 17, such removal not interfering with or changing the adjustment of the mechanical connections to cover 17.

An inner gimbal ring 18 surrounds cover 17 and is rotatably secured to it by a torque tube type ball bearing 19, partly shown in section. The plane of ring 18 passes close to the center of gravity of the assembly within the ring including the arrays 11, plate 14, cover 17 and all interior receiver-transmitter components. A bracket 21 is secured to inner gimbal ring 18 and supports an azimuth motor 22. A gear box 23 is secured to the underside of the bracket 21. The motor 22 operates a train of reduction gears housed in box 23, the final pinion 24 of which meshes with a ring gear 26 secured to the cover 17. Thus the motor produces azimuth rotation relative to ring 18 of the assembly including ring gear 26, the array 11, plate 14, cover 17 and all interior components.

In well-known systems for the automatic positioning of microwave antenna arrays the several motions such as azimuth rotations are operated by servomechanisms which, for example, may include a motor, a feedback tachometer, and a synchro for sensing positions. When such components are used they can be installed in a position similar to motor 22, or coupled to the motor shaft. Although such components are not depicted or described, it is to be understood that they may be added as required by the particular control system employed.

Figure 2:
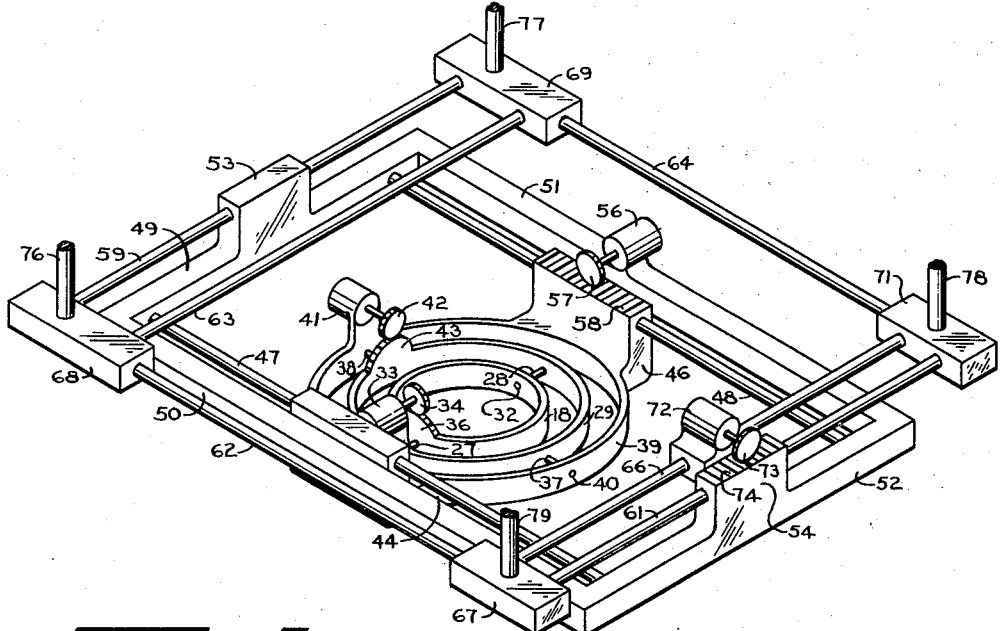
Figure 2 represents a gimbal ring assembly supported by frames having orthogonal translatory motions, the inner gimbal ring being adapted for support of the receiver-transmitter-antenna shown in Fig. 1, which is omitted from Fig. 2 for clarity.

The inner gimbal ring 18 is depicted in Fig. 2, but all parts including cover 17 fastened thereto and supported thereby as illustrated in Fig. 1 are omitted from Fig. 2 for the sake of clarity. Inner gimbal ring 18 is supported by means of lateral gimbal pins 27 and 28 from an intermediate gimbal ring 29, one of the bearings 31 for gimbal pin 27 being visible in Fig. 1. The other bearing 32, being diametrically opposite, is visible in Fig. 2 but not in Fig. 1.

Rotation of inner gimbal ring 18 about its bearing pins 27 and 28 relative to intermediate gimbal ring 29 is effected by a motor 33 mounted on intermediate ring 29. The motor pinion 34 is geared to a gear sector 36 mounted on inner gimbal ring 18.

Intermediate gimbal ring 29 is supported by pins 37 and 38 orthogonally positioned therein relative to pins 27 and 28. Pins 37 and 38 are rotatably secured in bearings in an outer gimbal ring 39, one such bearing 40 being depicted. Rotation of the intermediate gimbal ring 29 about pins 37 and 38 relative to outer ring 39 is effected by a motor 41 secured to ring 39 and carrying a pinion 42 meshing with a sector 43 secured to intermediate ring 29. Both the pitch bearing pins 27/28 and the roll bearing pins 37/38 are in the same horizontal plane and this plane substantially contains the center of gravity of the entire gimbal-supported mechanism. This design prevents linear accelerations from setting up couples tending to rotate the gimbals, and thus greatly reduces the duty of the pitch and roll gimbal motors and their gears.

The outer gimbal ring 39 is fixed to brackets 44 and 46, together constituting a longitudinal translation carriage. Brackets 44 and 46 slide on round rods 47 and 48. The rods 47 and 48 are fixed in a lateral frame consisting of rectangular bars 49, 50, 51 and 52, together with brackets 53 and 54 secured to bars 49 and 52 respectively. Rods 47 and 48 together with the described lateral frame may be termed the lateral translation carriage. Translation of the longitudinal translation carriage relative to the lateral translation carriage is effected by a motor 56 mounted on rectangular bar 52, the associated motor pinion 57 meshing with a rack 58 on bracket 46.

The lateral carriage brackets 53 and 54 slide on round rods 59 and 61 forming part of a support frame. This support frame includes rods 62, 63, 64, and 66 and corner blocks 67, 68, 69 and 71. Relative motion is effected by a motor 72 mounted on bar 66 and having a pinion 73 meshed with a rack 74 on bracket 54. The support frame is rigidly secured to the aircraft structure (not shown) by standards 76, 77, 78 and 79.

Motors 33, 41, 56 and 72 are depicted as having pinions mounted directly on their shafts. However, they may instead be gear motors having slow-speed output shafts, or a reduction gear box may be interposed between each motor and its pinion, if slower speed or higher torque operation be desired. Feedback and servo equipment may be employed in association with each of these motors as required by the particular system of control employed, as mentioned in connection with the azimuth motor.

In the operation of the device of this invention let it be supposed that a pitch rotation of 15° occurs while the roll rotation angle remains at zero. The roll rotation motion might as well have been selected for illustration or a combination of roll and pitch rotations, or of roll, pitch and azimuth rotations might have been selected, but for the purpose of description the single rotation is assumed. In Fig. 3, the rectangle 81 represents the longitudinal edge or side elevation of the antenna array 11, Fig. 1. Pivot bearing 82 schematically represents the pitch or inner gimbal bearings 31 and 32, and bars 83 and 84 represent rigid connections between the inner gimbal and the array. The structure 86 represents the skin of the aircraft, and the edges 87 and 88 thereof represent the after and forward edges of the window constituting the radome when the pitch angle is zero. The lines 89 and 91 represent, in this situation, the edges of the microwave radiation beam directed downward by the array and almost completely filling the window between edges 87 and 88.

When the aircraft nose pitches downward 15° the aircraft skin assumes the position 86' relative to the array, rotating about the array center of pitch rotation 82. This would result in the radome edge 88' cutting the beam edge 91 except that the array is simultaneously translated in a plane parallel to the aircraft skin by such an amount as again to direct all of the beam vertically downward through the radome. This is schematically indicated by movement of the bearing 82 along line 92 parallel to the skin 86' to a new position 82', so that the vertical beam edges 89' and 91' again pass between the radome edges 87' and 88'. A slightly larger radome is required at the 15° angle than at the zero pitch angle because of angularity, but the amount is minor by comparison with the amount saved by translating the array, for this amount saved is the horizontal distance D between beam edges 91 and 91'.

When the aircraft motion is a combination of pitch, roll, and azimuth rotations, the radome aperture must be larger, principally because azimuth rotations of the rectangular array may position the rectangular diagonal dimension thereof parallel to the aircraft fore-and-aft line, so that the radome longitudinal dimension must be large enough to pass the beam without interference at this azimuth angle. The radome aperture also must be slightly larger than than shown in Fig. 3 because the beam is not cylindrical, but has frustum form as before mentioned.

The fore-and-aft translation should be, for all practical purposes, a linear function of the pitch angle, with the maxima and the center positions coincident. The same relation should obtain in roll. These relations have been instrumented in the described embodiment, using the circuit of Fig. 4. A vertical reference 93 containing a sensing device such as a vertical gyroscope or other conventional component is provided with two angle-transmitting devices, such as pitch angle synchro transmitter 94 and roll angle synchro transmitter 96. These transmitters are connected through groups of conductors 97 and 98 to synchrol control transformers 99 and 101 respectively. The electrical signals produced by these synchro control transformers are suitably amplified by servo amplifiers 102 and 103 and applied to servo motors 33 and 41, these motors rotating the array in pitch and roll through pitch gimbal bearings 27 and 38 as before described. The control signals to control transformers 99 and 101 are also paralleled through conductors 104 and 106 to translation control transformers 107 and 108, which through translation servoamplifiers 109 and 111 and translation motors 56 and 72 produce translations in pitch and roll as linear functions of rotations in pitch and roll respectively.

What is claimed is:

1. An aircraft radio beam antena comprising, a beam antenna within said aircraft, a radome constituting an aperture for said beam, means including rotational bearings maintaining horizontality of said antenna through a range of attitudes of said aircraft, and means for translating said antenna during rotations in said bearings maintaining passage of said beam through said aperture.

2. An antenna positioned within the skin of an aircraft, said antenna comprising, an antenna array emitting a radio beam, a flush radome in said skin for passage of said beam, rotational means including fore-and-aft and lateral bearings for permitting relative rotation of said array and said aircraft about a fore-and-aft axis and about a lateral axis respectively, pitch means maintaining fore-and-aft horizontality of said array about said lateral bearings, roll means maintaining lateral horizontality of said array about said fore-and-aft bearings, fore-and-aft translation means translating said array fore-and-aft as a linear function of said pitch means operation, and lateral translation means translating said array laterally as a linear function of said roll means operation, whereby said beam passes through said radome at all limited pitch and roll angles with substantially the same clearances as at zero pitch and roll angles.

3. An antena positioned within the skin of an aircraft, said antena comprising, an antenna array emitting a radio beam, a flush radome in said skin for passage of said beam, rotational means including fore-and-aft axis and lateral axis bearings for permitting relative rotation of said array and said aircraft about a fore-and-aft axis and about a lateral axis respectively, pitch means maintaining fore-and-aft horizontality of said array about said lateral axis bearings, roll means maintaining lateral horizontality of said array about said fore-and-aft axis bearings, fore-and-aft translation means translating said array and said rotational means in a fore-and-aft direction as a synchronous linear function of said pitch means operation, and lateral translation means translating said array and said rotational means in a lateral direction as a synchronous linear function of said roll means operation, whereby the passage of said beam through said radome has substantially the same clearance at all permitted pitch and roll angles as at zero pitch and roll angles.

4. A microwave antenna positioned entirely within the skin of an aircraft, said antenna comprising, an antenna array emitting a radio beam, a flush radome in said skin having minimum aperture area for complete passage of said beam at all permitted angles of pitch, roll and azimuth, pitch gimbal bearings, roll gimbal bearings, said pitch and roll bearings being in a plane substantially comprehending the center of gravity of the gimballed mass, pitch stabilization means rotating said array relative to said aircraft about said pitch bearings maintaining horizontality during pitching of the aircraft, roll stabilization means rotating said array relative to said aircraft about said roll bearings maintaining horizontality during rolling of the aircraft, fore-and-aft translation means synchronized with said pitch stabilization means maintaining direction of all of said beam through said radome aperture during pitching, said fore-and-aft translation amplitude being a function of the pitch angle with maxima coincident, and lateral translation means synchronized with said roll stabilization means maintaining direction of all of said beam through said radome aperture during rolling, said lateral translation amplitude being a function of the roll angle with maxima coincident, whereby the radome aperture area required by said beam at any permitted pitch and roll angles is substantially no greater than the aperture area required at zero pitch and roll angles.

5. A microwave antenna in accordance with claim 4 in which said fore-and-aft translation amplitude is a linear function of the pitch angle, and said lateral translation amplitude is a linear function of the roll angle.

6. Microwave echo signal equipment positioned entirely within the skin of an aircraft comprising, an antenna array emitting a microwave beam of radiation, a microwave receiver-transmitter rigidly secured to said array, a flush radome in said skin having minimum area for complete passage of said beam at all permitted angles of pitch, roll and azimuth, pitch gimbal bearings, roll gimbal bearings, pitch stabilization means rotating said array relative to said aicaft about said pitch gimbal bearings maintaining horizontality of the fore-and-aft axis of the array during pitching of the aircraft, roll stabilization means rotating said array relative to said aircraft about said roll gimbal bearings maintaining horizontality of the transverse axis of the array during rolling of the aircraft, fore-and-aft translation means external to said gimbals synchronized with said pitch stabilization means maintaining direction of all of said beam through said radome aperture during pitching, said fore-and-aft translation amplitude being a linear function of the pitch angle with maxima coincident, and lateral translation means external to said gimbals synchronized with said roll stabilization means maintaining direction of all of said beam through said radome aperture during rolling, said lateral translation amplitude being a linear function of the roll angle with maxima coincident, whereby the radome aperture required by said beam at any permitted pitch and roll angles is substantially the same as the aperture required at zero pitch and roll angles.

No references cited.